(12) United States Patent
Shibasaki et al.

(10) Patent No.: US 11,856,643 B2
(45) Date of Patent: Dec. 26, 2023

(54) ELECTRONIC EQUIPMENT

(71) Applicant: KYOCERA Corporation, Kyoto (JP)

(72) Inventors: Toshiyuki Shibasaki, Kawasaki (JP);
Daisuke Haraki, Yokohama (JP);
Yoshinori Senoo, Katano (JP)

(73) Assignee: KYOCERA Corporation, Kyoto (JP)

( * ) Notice: Subject to any disclaimer, the term of this patent is extended or adjusted under 35 U.S.C. 154(b) by 361 days.

(21) Appl. No.: 17/209,705

(22) Filed: Mar. 23, 2021

(65) Prior Publication Data
US 2021/0212159 A1   Jul. 8, 2021

Related U.S. Application Data

(63) Continuation of application No. PCT/JP2019/037504, filed on Sep. 25, 2019.

(30) Foreign Application Priority Data

Sep. 25, 2018 (JP) ................. 2018-178720
Sep. 26, 2018 (JP) ................. 2018-180243
Sep. 26, 2018 (JP) ................. 2018-180249

(51) Int. Cl.
*H04W 76/50* (2018.01)
*H04W 4/029* (2018.01)
*H04H 20/24* (2008.01)
*H04H 20/59* (2008.01)
*G01S 19/48* (2010.01)

(52) U.S. Cl.
CPC ............. *H04W 76/50* (2018.02); *G01S 19/48* (2013.01); *H04H 20/24* (2013.01); *H04H 20/59* (2013.01); *H04W 4/029* (2018.02)

(58) Field of Classification Search
CPC ..... H04W 76/50; H04W 4/029; H04W 4/027; H04W 4/02; H04W 4/90; G01S 19/48; G01S 19/17; G01S 19/34; H04H 20/24; H04H 20/59; H04M 1/00; H04M 1/73
See application file for complete search history.

(56) References Cited

U.S. PATENT DOCUMENTS 6,421,526 B1 *  7/2002  Banno ................... H01Q 21/28
                                                           455/12.1
2002/0197988 A1 * 12/2002  Hellaker ............. H04M 11/002
                                                           455/423
2013/0309995 A1   11/2013  Shikama et al.

FOREIGN PATENT DOCUMENTS

| JP | 2008158599 A | 7/2008 |
| JP | 2013042383 A | 2/2013 |
| JP | 2013077930 A | 4/2013 |

* cited by examiner

*Primary Examiner* — Umair Ahsan
(74) *Attorney, Agent, or Firm* — Studebaker & Brackett PC

(57) ABSTRACT

An electronic equipment 100 includes a cellular communicator 111 configured to perform cellular communication with a base station, a GNSS receiver 120 configured to receive, from a satellite, a satellite signal of information related to disaster, and a controller 130 configured to control whether to perform processing of the satellite signal in response to whether the electronic equipment 100 is in an area of the cellular communication.

4 Claims, 7 Drawing Sheets

FIG. 2

| SIGNAL NAME | DISTRIBUTION SERVICE | CENTER FREQUENCY |
|---|---|---|
| L1C/A | SATELLITE POSITINING SERVICE | 1575.42MHz |
| L1C | SATELLITE POSITINING SERVICE | |
| L1S | SUB-METER LEVEL AUGMENTATION SERVICE | |
| L1S | SATELLITE REPORT FOR DISASTER AND CRISIS MANAGEMENT | |
| L1Sb | AUGMENTATION (SBAS TRANSMISSION SERVICE) | |
| L2C | SATELLITE POSITIONING SERVICE | 1227.60MHz |
| L5 | SATELLITE POSITIONING SERVICE | 1176.45MHz |
| L5S | POSITIONING TECHNOLOGY VERIFICATION SERVICE | |
| L6 | CENTIMETER LEVEL AUGMENTATION SERVICE | 1278.75MHz |
| S-BAND | SATELLITE SAFETY CONFIRMATION SERVICE | 2002.50MHz |

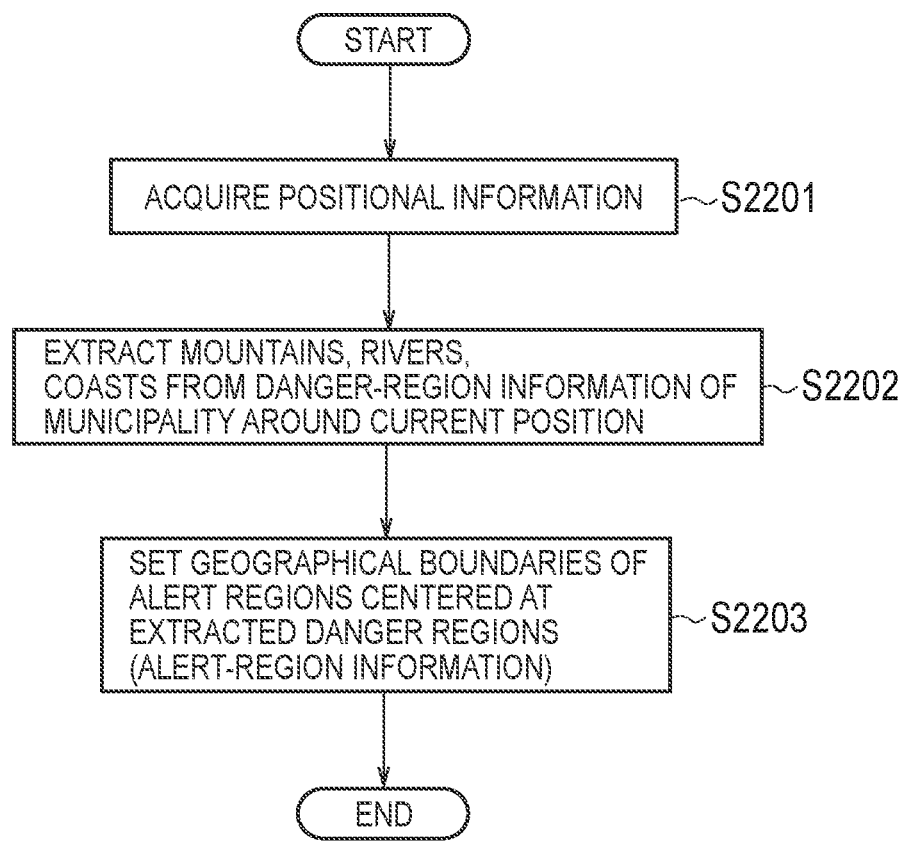

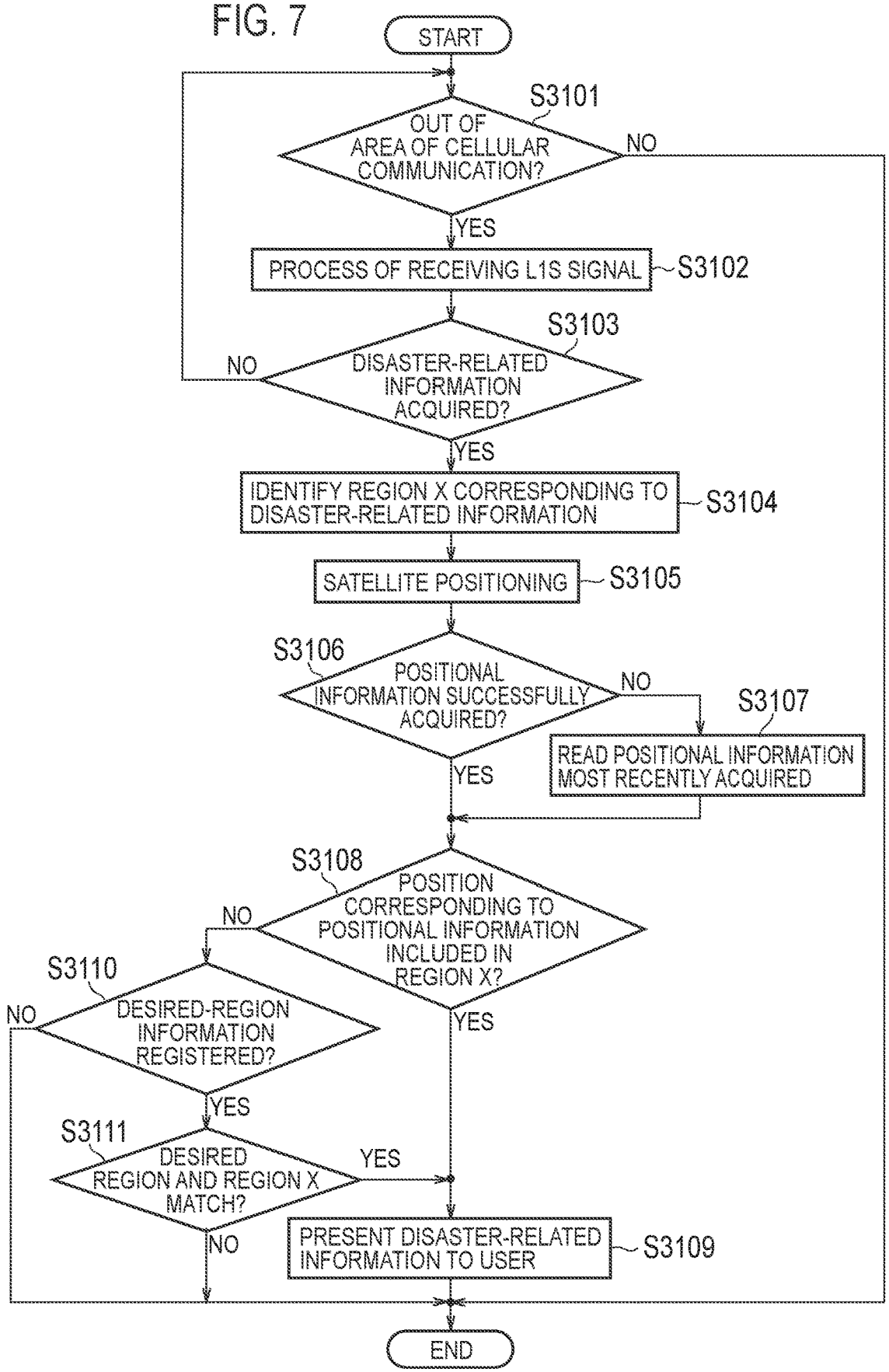

ELECTRONIC EQUIPMENT

RELATED APPLICATIONS

The present application is a continuation based on PCT Application No. PCT/JP2019/037504, filed on Sep. 25, 2019, which claims the benefit of Japanese Patent Application No. 2018-178720 filed on Sep. 25, 2018, Japanese Patent Application No. 2018-180243 filed on Sep. 26, 2018, and Japanese Patent Application No. 2018-180249 filed on Sep. 26, 2018. The content of which is incorporated by reference herein in their entirety.

TECHNICAL FIELD

The present invention relates to electronic equipment.

BACKGROUND ART

Conventionally, a technique of broadcasting disaster-related information related to disaster from a base station to electronic equipment has been widely used (see Patent Literature 1, for example).

Meanwhile, the Quasi-Zenith Satellite System (QZSS) has come into operation. The QZSS is a Japanese positioning system often referred to as "Michibiki". The Global Positioning System (GPS), which is a U.S. positioning system, does not have sufficient positioning accuracy because of a small number of GPS satellites that can be captured and low signal intensity in environments where the sky cannot be seen (such as a mountainous region and an urban region). The QZSS complements the GPS positioning to improve the positioning accuracy and provide higher services. Specifically, QZSS satellites transmit satellite signals for disaster-related information reporting services in addition to satellite signals for positioning-related services.

CITATION LIST

Patent Literature

Patent Literature 1: Japanese Patent Laid-Open No. 2008-158599

SUMMARY

An electronic equipment according to a first feature includes a cellular communicator configured to perform cellular communication with a base station, a receiver configured to receive, from a satellite, a signal of information related to disaster, and a controller configured to perform processing of the signal when the electronic equipment is incapable of the cellular communication.

An electronic equipment according to a second feature includes a receiver configured to receive, from a satellite, a signal of information related to disaster. The electronic equipment further includes a controller configured to control whether to process the signal based on a current position of the electronic equipment.

An electronic equipment according to a third feature includes a receiver configured to receive, from a satellite, a signal of information related to disaster. The electronic equipment further comprises a controller configured to perform determination on whether to present the information to a user based on a current position of the electronic equipment. The controller is configured to perform the determination by using past positional information acquired in a certain past period of time instead of the current position of the electronic equipment when the information is acquired and acquisition of the current position of the electronic equipment fails.

BRIEF DESCRIPTION OF DRAWINGS

FIG. 2 is a diagram illustrating types of satellite signals transmitted by a positioning satellite according to embodiments.

FIG. 6 is a diagram illustrating an example of an operation of setting alert-region information according to the second embodiment.

FIG. 7 is a diagram illustrating an operation example of electronic equipment according to a third embodiment.

DESCRIPTION OF EMBODIMENTS

Figure 1:
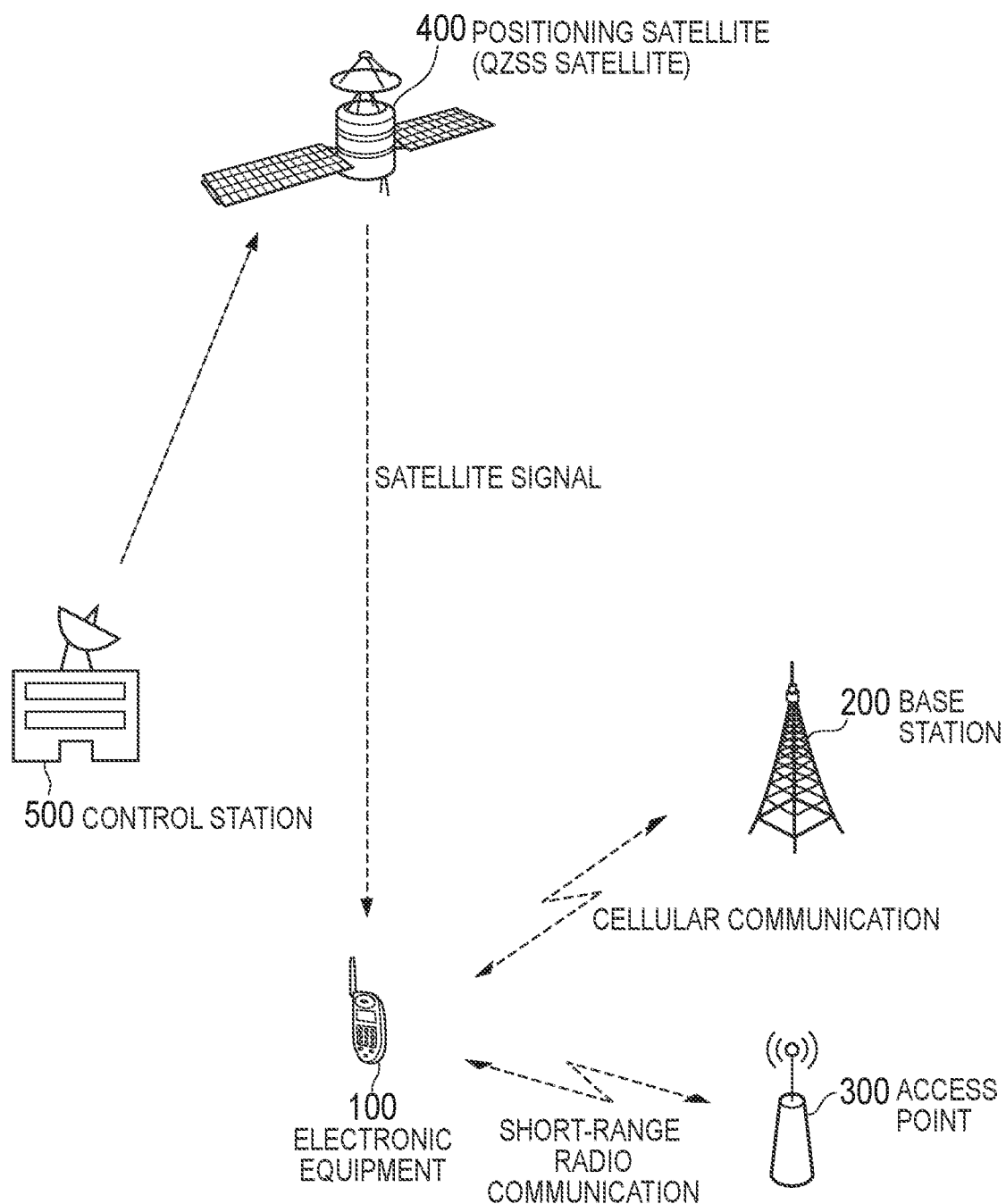
FIG. 1 is a diagram illustrating an entire configuration example according to embodiments.

In order for electronic equipment to acquire disaster-related information included in satellite signals, the electronic equipment needs to constantly receive the satellite signals, which causes a problem of increased power consumption of the electronic equipment.

Thus, the present disclosure makes it possible to acquire disaster-related information included in satellite signals while suppressing increase in power consumption.

Electronic equipment according to embodiments will be described with reference to the drawings. In the drawings, the same or similar portions are given the same or similar reference numerals.

First Embodiment (Entire Configuration)

FIG. 1 is a diagram illustrating an entire configuration example according to a first embodiment. As illustrated in FIG. 1, a system according to the first embodiment includes electronic equipment 100, a base station 200, an access point 300, and a positioning satellite 400.

The electronic equipment 100 is equipment having a function of receiving satellite signals from the positioning satellite 400 and a function of performing cellular communication with the base station 200. The electronic equipment 100 may be any equipment as long as it is equipment having a function of receiving satellite signals from the positioning satellite and a function of performing cellular communication with the base station 200, and is, for example, a smartphone, a feature phone, a tablet terminal, a notebook PC, a smartwatch, a radio communication module, a radio communication card, or the like. The radio communication module or radio communication card may be provided in any moving body, and may be provided in a vehicle or the like, for example.

The electronic equipment 100 may have a function of performing short-range radio communication with the access point 300 in addition to the function of performing cellular communication with the base station 200.

The base station 200 is an apparatus that performs cellular communication with the electronic equipment 100. The scheme for the cellular communication may be Wideband Code Division Multiple Access (W-CDMA), Long Term Evolution (LTE), or New Radio (NR), which is a fifth-generation cellular communication scheme.

The base station 200 has a function of broadcasting disaster-related information related to disaster (information related to disaster) to electronic equipment 100 in its own coverage area.

For example, the base station 200 broadcasts the disaster-related information by using a function of the Earthquake and Tsunami Warning System (ETWS) defined in the Third Generation Partnership Project (3GPP) standards. Specifically, the base station 200 transmits the disaster-related information included in system information to be broadcast.

The system information can be received by not only the electronic equipment 100 in the connected state, which is a state in communication, but also by the electronic equipment 100 in the idle state, which is a state of waiting for a call. Thus, electronic equipment 100 in the coverage area of the base station 200, that is, electronic equipment 100 in the range of cellular communication can receive the disaster-related information from the base station 200.

The access point 300 is an apparatus that performs short-range radio communication with the electronic equipment 100. For example, the access point 300 may be a radio LAN access point that performs radio LAN communication as the short-range radio communication, or may be a Bluetooth (registered trademark, the same applies hereinafter) access point that performs Bluetooth communication as the short-range radio communication.

The positioning satellite 400 is an apparatus that transmits satellite signals for positioning services. In the first embodiment, the positioning satellite 400 is a QZSS satellite. The positioning satellite 400 transmits satellite signals for disaster-related information reporting services in addition to satellite signals for positioning services. The positioning satellite 400 receives disaster-related information from a ground control station 500 and transmits the received disaster-related information included in a satellite signal.

FIG. 2 is a diagram illustrating types of satellite signals transmitted by the positioning satellite 400. As illustrated in FIG. 2, the satellite signals transmitted by the positioning satellite 400 include satellite signals for positioning-related services and satellite signals for disaster-related information reporting services.

The satellite signals for the positioning-related services include L1C/A signals, L1C signals, L1Sb signals, L2C signals, L5 signals, L5S signals, and L6 signals.

Signals other than the L6 signals and S-band signals are transmitted at the same frequency as in the GPS. The L1C/A signals, the L1C signals, the L2C signals, and the L5 signals are signals compatible with the GPS. Thus, the electronic equipment 100 can use the L1C/A signals, the L1C signals, the L2C signals, and the L5 signals for position measurement in combination with the GPS signals to achieve position measurement with high accuracy.

The satellite signals for the disaster-related information reporting services include L1S signals. The L1S signals are also used for a positioning-related service (sub-meter level augmentation service). Although an example in which the satellite signals for the disaster-related information reporting services are L1S signals will be described below, the satellite signals for the disaster-related information reporting services may also be S-band signals.

The L1S signals are used to provide the satellite report for disaster and crisis management. The satellite report for disaster and crisis management is a service for transmitting, from the positioning satellite 400, disaster information of earthquakes, tsunamis and the like, crisis management information of terrorism and the like, conditions of issuing of evacuation advisories and the like from government agencies for disaster prevention and crisis management.

The satellite report for disaster and crisis management is a service for distributing messages such as disaster information to users, and is available for electronic equipment 100 capable of receiving the L1S signals. The interval of distributing the messages is four seconds, for example. Since the L1S signals have the same frequency and the same waveform as the GPS signals and the L1C/A signals, a satellite signal receiver (GNSS receiver) can be configured at low cost.

However, in order for the electronic equipment 100 to acquire disaster-related information included in the L1S signals, the receiving side (electronic equipment 100) needs to continuously perform receiving and analyzing operations in order to unfailingly receive the transmitted signals while transmission from the positioning satellite 400 occurs every four seconds. Thus, the power consumption of the electronic equipment 100 is increased.

(Configuration of Electronic Equipment)

Figure 3:
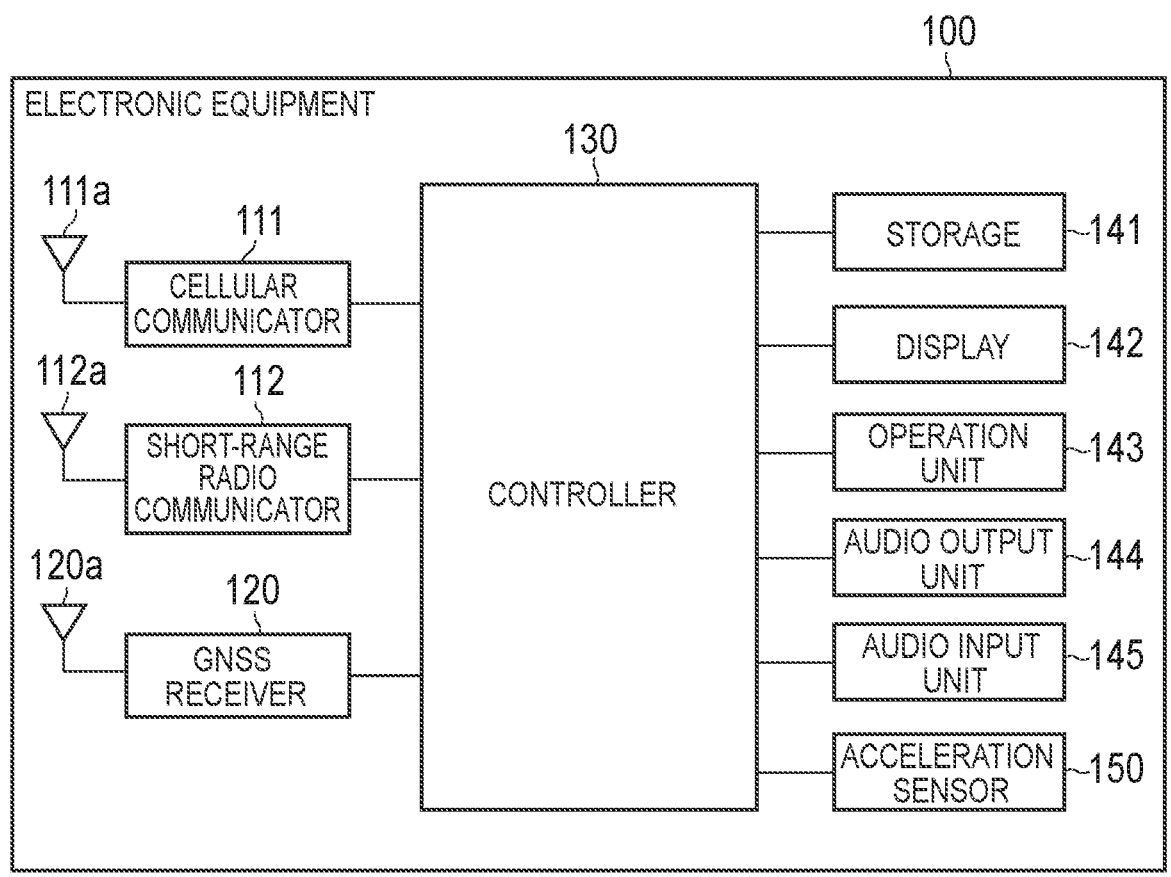
FIG. 3 is a diagram illustrating a configuration of electronic equipment according to embodiments.

FIG. 3 is a diagram illustrating a configuration of the electronic equipment 100 according to the first embodiment.

As illustrated in FIG. 3, the electronic equipment 100 includes a cellular communicator 111, a short-range radio communicator 112, a Global Navigation Satellite System (GNSS) receiver (receiving unit) 120, a controller 130, a storage 141, a display 142, an operation unit 143, an audio output unit 144, an audio input unit 145, and an acceleration sensor 150. The GNSS receiver 120 corresponds to a satellite signal receiver.

The electronic equipment 100 may further include other components such as a power supply (battery). At least one of the display 142, the operation unit 143, the audio output unit 144, and the audio input unit 145 may be provided externally.

The cellular communicator 111 performs amplification, filtering and the like on a cellular radio signal received by an antenna 111a, converts the cellular radio signal into a baseband signal, and outputs it to the controller 130. In addition, the cellular communicator 111 converts a baseband signal input from the controller 130 into a cellular radio signal, performs amplification and the like, and transmits it from the antenna 111a.

The short-range radio communicator 112 performs amplification, filtering and the like on a short-range radio signal (radio LAN signal or Bluetooth (registered trademark) signal) received by an antenna 112a, converts the short-range radio signal into a baseband signal, and outputs it to the controller 130. In addition, the short-range radio communicator 112 converts a baseband signal input from the controller 130 into a short-range radio signal, performs amplification and the like, and transmits it from the antenna 112a.

The GNSS receiver 120 is a receiver that supports at least reception of the L1S signals. The GNSS receiver 120 may be a multi-GNSS receiver that supports both of the GPS and QZSS. The GNSS receiver 120 performs amplification, filtering and the like on a satellite signal received by an antenna 120a, converts the satellite signal into a baseband signal for demodulation and decoding.

Then, the GNSS receiver 120 performs position measurement by calculating a geographical position (latitude, longitude, and altitude) from the decoded information, and outputs positional information obtained by the position measurement to the controller 130. When receiving an L1S signal, the GNSS receiver 120 acquires disaster-related information included in the L1S signal by demodulation and decoding and outputs the acquired disaster-related information to the controller 130.

The controller 130 includes at least one processor. The controller 130 may also include a Digital Signal Processor (DSP), a Central Processing Unit (CPU), a codec and the like. The controller 130 performs various types of processing and control in the electronic equipment 100 by executing programs stored in the storage 141.

The storage 141 includes a volatile memory and a non-volatile memory. The volatile memory includes a Random Access Memory (RAM). The non-volatile memory includes a Read Only Memory (ROM) and an Electronically Erasable and Programmable Read Only Memory (EEPROM). The storage 141 stores programs executed by the controller 130 and information used for processing by the controller 130.

The display 142 includes a liquid crystal display, an organic EL display, or the like. The display 142 displays an image based on an image signal input from the controller 130.

The operation unit 143 includes various keys, buttons and the like. The operation unit 143 receives an operation input from a user and outputs an operation signal indicating the operation details to the controller 130. At least part of the operation unit 143 may be constructed integrally with the display 142 as a touch panel.

The audio output unit 144 includes a speaker and outputs an audio based on an audio signal input from the controller 130. The audio input unit 145 includes a microphone, receives an audio input from the user, and outputs an audio signal to the controller 130.

The acceleration sensor 150 detects an acceleration applied to the electronic equipment 100 and outputs information (sensor value) indicating the detected acceleration to the controller 130.

In the electronic equipment 100 configured in this manner, the GNSS receiver (receiving unit) 120 receives an L1S signal including disaster-related information related to disaster (information related to disaster). The controller 130 controls whether to perform processing of the L1S signal based on whether the electronic equipment 100 is in the area of cellular communication. The processing of the L1S signal includes searching (capturing) of the L1S signal. The processing of the L1S signal may also include demodulation and decoding of the L1S signal. Here, a state where the electronic equipment 100 is in the area of cellular communication (i.e., in-area state) refers to a state where the received power of a cellular reference signal (e.g., cell-specific reference signal) received by the electronic equipment 100 from the base station 200 at a supported cellular frequency exceeds a threshold, for example. The electronic equipment 100 in the in-area state is capable of receiving cellular communication services. That is, the in-area state refers to a state where the electronic equipment 100 is capable of cellular communication.

In addition, the electronic equipment 100 in the in-area state is capable of receiving disaster-related information (information related to disaster) broadcast from the base station 200. Thus, when the electronic equipment 100 is in the area of cellular communication, there is low necessity of receiving the L1S signal, and therefore the controller 130 does not perform the processing of the L1S signal. That is, when the electronic equipment 100 is capable of cellular communication, the controller 130 does not perform the processing of the L1S signal. In this manner, increase in the power consumption of the electronic equipment 100 can be suppressed.

On the other hand, a state where the electronic equipment 100 is out of the area of cellular communication (i.e., out-of-area state) refers to a state where the received power of a cellular reference signal received by the electronic equipment 100 from the base station 200 at a supported cellular frequency is below a threshold, for example. The electronic equipment 100 in the out-of-area state is incapable of receiving cellular communication services. That is, the out-of-area state refers to a state where the electronic equipment 100 is incapable of cellular communication.

In addition, the electronic equipment 100 in the out-of-area state is incapable of receiving disaster-related information (information related to disaster) broadcast from the base station 200. Thus, when the electronic equipment 100 is out of the area of cellular communication, there is high necessity of receiving the L1S signal, and therefore the controller 130 performs the processing of the L1S signal. That is, when the electronic equipment 100 is incapable of cellular communication, the controller 130 performs the processing of the L1S signal.

In the first embodiment, the controller 130 starts the processing of the L1S signal when the electronic equipment 100 moves from the inside to the outside of the area of cellular communication in a state where the processing of the L1S signal is stopped. That is, when the electronic equipment 100 changes from a state of being capable of cellular communication to a state of being incapable of cellular communication in the state where the processing of the L1S signal is stopped, the controller 130 starts the processing of the L1S signal.

On the other hand, the controller 130 stops the processing of the L1S signal when the electronic equipment 100 moves from the outside to the inside of the area of cellular communication in a state where the processing of the L1S signal is started. That is, when the electronic equipment 100 changes from a state of being incapable of cellular communication to a state of being capable of cellular communication in the state where the processing of the L1S signal is started, the controller 130 stops the processing of the L1S signal.

In the first embodiment, the controller 130 acquires disaster-related information included in a cellular signal received by the cellular communicator 111 in a state where the electronic equipment 100 is in the area of cellular communication. That is, in a state where the electronic equipment 100 is capable of cellular communication, the controller 130 performs the processing of the cellular signal of the information related to disaster received by the cellular communicator 111. On the other hand, the controller 130 acquires disaster-related information included in the L1S signal received by the GNSS receiver 120 in a state where the electronic equipment 100 is out of the area of cellular communication. That is, in a state where the electronic equipment 100 is incapable of cellular communication, the controller 130 performs the processing of the L1S signal received by the receiving unit of the electronic equipment 100. In this manner, the electronic equipment 100 can acquire the disaster-related information (information related to disaster) both inside and outside the area of cellular communication, that is, in both cases where the electronic equipment is capable of cellular communication and where the electronic equipment is incapable of cellular communication.

In the first embodiment, the controller 130 determines whether the electronic equipment 100 has moved based on an output of the acceleration sensor 150 when the processing of the L1S signal fails in a state where the processing of the L1S signal is started. A situation where the processing of the L1S signal fails is, for example, a situation where the electronic equipment 100 is located in an enclosed space (such as a building or a tunnel), and therefore it is considered that the reception status of the L1S signal will not be improved without movement. Therefore, the controller 130 stops the processing of the L1S signal when it is determined that the electronic equipment 100 has not moved. In this manner, increase in the power consumption of the electronic equipment 100 can be suppressed.

(Operation Example of Electronic Equipment)

Figure 4:
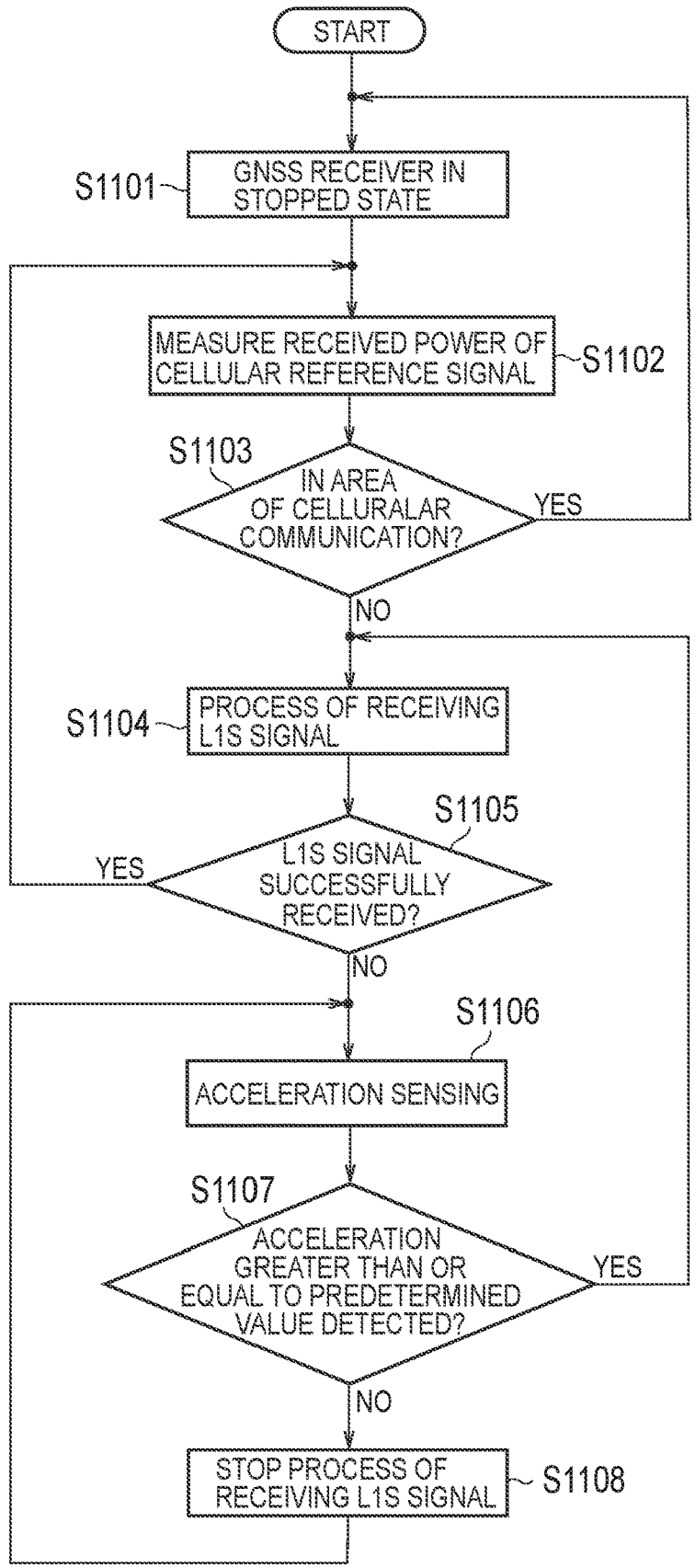
FIG. 4 is a diagram illustrating an operation example of electronic equipment according to a first embodiment.

FIG. 4 is a diagram illustrating an operation example of the electronic equipment 100 according to the first embodiment.

As illustrated in FIG. 4, in step S1101, the GNSS receiver (receiving unit) 120 is in a stopped state. Specifically, the controller 130 does not cause the GNSS receiver 120 to perform a process of receiving the L1S signal. That is, the controller 130 stops the processing of the L1S signal. However, the controller 130 may control the GNSS receiver 120 to perform satellite positioning in response to a request from an application.

In step S1102, the controller 130 controls the cellular communicator 111 to measure the received power of a cellular reference signal received by the electronic equipment 100 from the base station 200 at a supported cellular frequency.

In step S1103, the controller 130 checks whether the electronic equipment 100 is in the area of cellular communication based on the received power measured in step S1102. When the electronic equipment 100 is in the area of cellular communication (step S1103: YES), the process returns to step S1101.

On the other hand, when the electronic equipment 100 is out of the area of cellular communication, that is, when the electronic equipment 100 is capable of cellular communication (step S1103: NO), in step S1104, the controller 130 starts the processing of the L1S signal. For example, the controller 130 controls the GNSS receiver 120 to continuously search for and receive (demodulate and decode) the L1S signal transmitted at a frequency of once in every four seconds such that it can be unfailingly received. The controller 130 may perform satellite positioning in performing the processing of the L1S signal.

Note that, when the disaster-related information (information related to disaster) included in the L1S signal received by the GNSS receiver 120 indicates the occurrence of a disaster, the controller 130 may control the display 142 and/or the audio output unit 144 to present (display and/or audibly output) the disaster-related information to the user.

In step S1105, the controller 130 checks whether the processing of the L1S signal has succeeded. Note that that the processing of the L1S signal has succeeded means that the GNSS receiver 120 has been able to correctly decode the L1S signal, and that the processing of the L1S signal has failed means that the GNSS receiver 120 cannot decode the L1S signal.

When the processing of the L1S signal succeeds (step S1105: YES), the process returns to step S1102.

On the other hand, when the processing of the L1S signal fails (step S1105: NO), in step S1106, the controller 130 controls the acceleration sensor 150 sense (detect) the acceleration.

In step S1107, the controller 130 checks whether an acceleration greater than or equal to a predetermined value is detected in step S1106. When an acceleration greater than or equal to the predetermined value is detected (step S1107: YES), the process returns to step S1104, and the process of receiving the L1S signal is retried.

On the other hand, when an acceleration greater than or equal to the predetermined value is not detected (step S1107: NO), in step S1108, the controller 130 stops the process of receiving the L1S signal. The process then returns to step S1106.

Second Embodiment

A second embodiment will be described mainly with regard to differences from the first embodiment. A configuration of the electronic equipment 100 according to the second embodiment will be described below.

In the electronic equipment 100 according to the second embodiment, the storage 141 stores alert-region information indicating an alert region corresponding to a region potentially subject to disaster. The storage 141 may store alert-region information preset at the time of manufacture or shipping of the electronic equipment 100, may store alert-region information set by communication from a server, or may store alert-region information autonomously generated from map information or the like.

The alert region indicated by the alert-region information includes at least one region of a mountain, a coast, and a river. These regions are regions potentially subject to disaster. For example, a mountain is a region potentially subject to eruption, a coast is a region potentially subject to tsunami damage, and a river is a region potentially subject to river flooding. The alert region may be a region in a certain range centered at a region potentially subject to disaster (mountain, coast, river).

The controller 130 acquires positional information indicating the geographical position of the electronic equipment 100 (the current position of the electronic equipment 100), and controls whether to perform the processing of the L1S signal based on a result of comparing the acquired positional information (current position) and the alert-region information stored in the storage 141. The processing of the L1S signal includes searching (capturing) of the L1S signal. The processing of the L1S signal may also include demodulation and decoding of the L1S signal.

As described above, by controlling whether to perform the processing of the L1S signal in consideration of the current position of the electronic equipment 100 and the alert region, the L1S signal can be received only when the electronic equipment 100 is located near a region potentially subject to disaster, that is, when the disaster-related information (related to disaster) included in the L1S signal is assumed to be useful. In this manner, increase in the power consumption of the electronic equipment 100 can be suppressed.

Note that the electronic equipment 100 according to the second embodiment may not include the acceleration sensor 150.

(Operation Example of Electronic Equipment)

Figure 5:
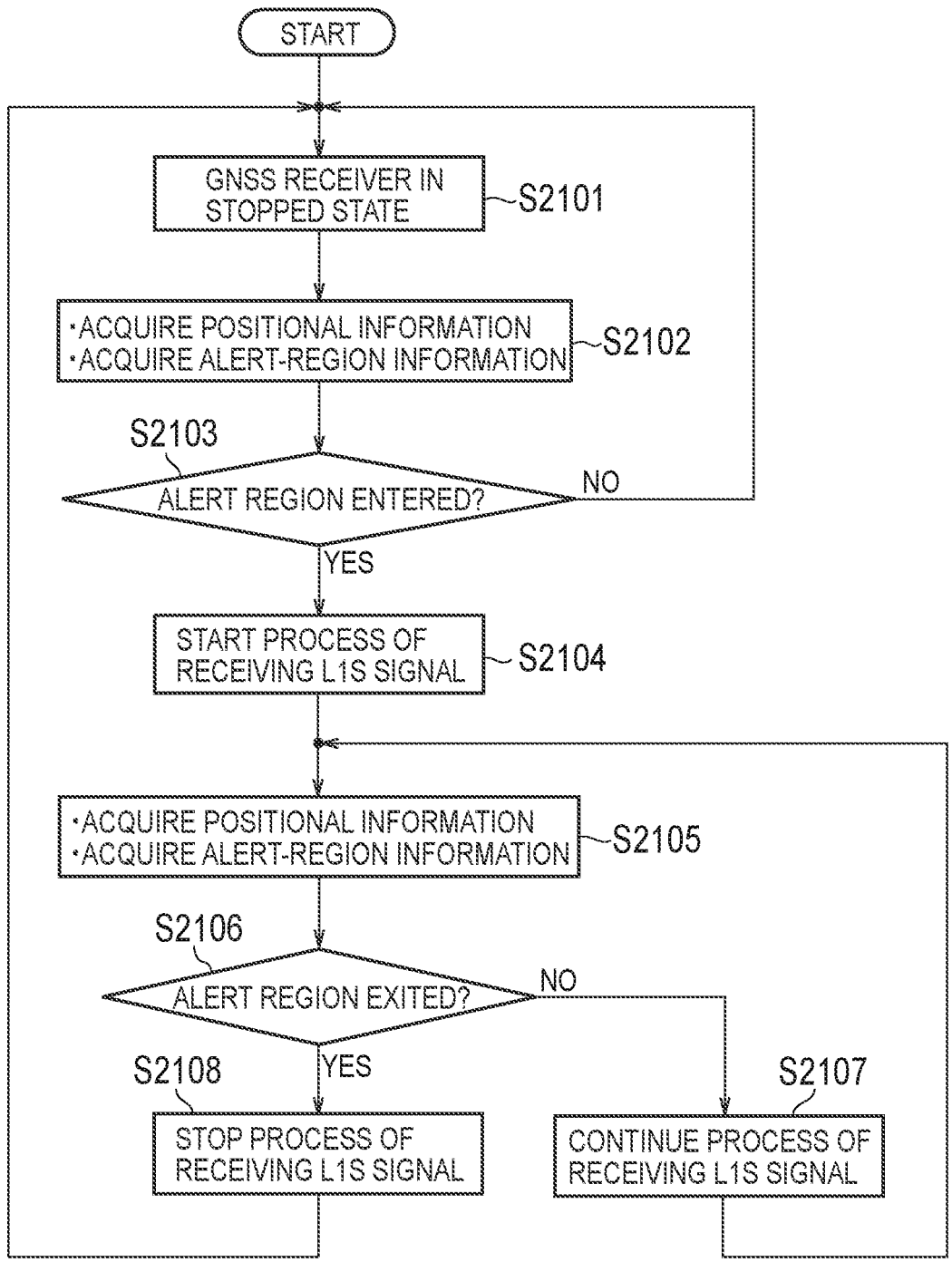
FIG. 5 is a diagram illustrating an operation example of electronic equipment according to a second embodiment.

FIG. 5 is a diagram illustrating an operation example of the electronic equipment 100 according to the second embodiment.

As illustrated in FIG. 5, in step S2101, the electronic equipment 100 is located outside the alert region, and the GNSS receiver 120 is in the stopped state. Specifically, the controller 130 does not cause the GNSS receiver 120 to perform a process of receiving the L1S signal. That is, the controller 130 stops the processing of the L1S signal. However, the controller 130 may control the GNSS receiver 120 to perform satellite positioning in response to a request from an application.

In step S2102, the controller 130 acquires positional information indicating the geographical position of the electronic equipment 100 (the current position of the electronic equipment 100). Here, the controller 130 may acquire the current position of the electronic equipment 100 in a manner different from satellite positioning.

For example, the controller 130 acquires the current position of the electronic equipment 100 based on a cellular radio signal received by the cellular communicator 111 from the base station 200. Methods of acquiring the current position of the electronic equipment 100 based on the cellular radio signal include a method based on the reference signal received power (RF fingerprint) from a plurality of base stations 200, a method based on a cell identifier included in the cellular radio signal, and the like.

Alternatively, the controller 130 may acquire the current position of the electronic equipment 100 based on a short-range radio signal received by the short-range radio communicator 112 from the access point 300. Methods of acquiring the current position of the electronic equipment 100 based on the short-range radio signal include a method based on the identifier (SSID) of the access point 300, a method based on positional information included in a beacon signal, and the like.

Alternatively, the controller 130 may acquire positional information generated by satellite positioning when performing the satellite positioning in response to a request from an application.

In addition, the controller 130 acquires alert-region information stored in the storage 141.

In step S2103, the controller 130 checks whether the electronic equipment 100 has entered an alert region by comparing the positional information and the alert-region information. That is, the controller 130 detects that the electronic equipment 100 enters the alert region based on the current position of the electronic equipment 100 and the alert-region information.

When the electronic equipment 100 has not entered the alert region (step S2103: NO), the process returns to step S2101.

On the other hand, when the electronic equipment 100 enters the alert region (step S2103: YES), in step S2104, the controller 130 starts the processing of the L1S signal. For example, the controller 130 controls the GNSS receiver 120 to continuously search for and receive (demodulate and decode) the L1S signal transmitted at a frequency of once in every four seconds such that it can be unfailingly received. The controller 130 may perform satellite positioning in performing the processing of the L1S signal.

Note that, when the disaster-related information included in the L1S signal received by the GNSS receiver 120 indicates the occurrence of a disaster, the controller 130 may control the display 142 and/or the audio output unit 144 to present (display and/or audibly output) the disaster-related information to the user.

After starting the processing of the L1S signal, in step S2105, the controller 130 acquires positional information indicating the geographical position of the electronic equipment 100 (the current position of the electronic equipment 100). Here, the controller 130 may acquire the current position of the electronic equipment 100 by satellite positioning, or may acquire the current position of the electronic equipment 100 in a manner different from the satellite positioning. In addition, the controller 130 acquires alert-region information stored in the storage 141.

In step S2106, the controller 130 checks whether the electronic equipment 100 has exited the alert region by comparing the current position of the electronic equipment 100 and the alert-region information acquired in step S2105. That is, the controller 130 detects that the electronic equipment 100 exits the alert region based on the current position of the electronic equipment 100 and the alert-region information.

When the electronic equipment 100 has not exited the alert region (step S2106: NO), in step S2107, the controller 130 continues the processing of the L1S signal. The process then returns to step S2105.

On the other hand, when the electronic equipment 100 exits the alert region (step S2106: YES), in step S2108, the controller 130 stops the processing of the L1S signal. The controller 130 may control the GNSS receiver 120 to stop all operations including the satellite positioning. The process then returns to step S2101.

FIG. 6 is a diagram illustrating an example of an operation of setting the alert-region information. This operation may be performed by the electronic equipment 100 or may be performed by a server or the like that is not illustrated in the figure, and a case where the electronic equipment 100 performs the operation will be described. Note that the operation illustrated in FIG. 6 may be periodically performed or may be performed on a predetermined trigger.

As illustrated in FIG. 6, in step S2201, the controller 130 acquires positional information indicating the geographical position of the electronic equipment 100 (the current position of the electronic equipment 100). Here, the controller 130 may acquire the current position of the electronic equipment 100 by satellite positioning, or may acquire the current position of the electronic equipment 100 in a manner different from the satellite positioning.

In step S2202, the controller 130 extracts, as danger regions potentially subject to disaster, mountains, rivers, and coasts from danger-region information of a municipality around the current position of the electronic equipment 100 acquired in step S2201. Here, the controller 130 may acquire the danger-region information of the municipality from a server or the like that is not illustrated in the figure, or may acquire the danger-region information stored in advance in the storage 141.

In step S2203, the controller 130 sets, as the alert-region information, geographical boundaries (so-called geofences) of alert regions centered at the extracted danger regions based on the danger regions extracted in step S2202 and map information and the like. Here, the controller 130 may acquire the map information from a server or the like that is not illustrated in the figure, or may acquire the map information stored in advance in the storage 141. The controller 130 causes the storage 141 to store the set alert-region information.

Third Embodiment

In a case of transmitting disaster-related information from a base station, it is possible to perform region-limited information distribution in which only a base station in a particular region transmits the disaster-related information. However, in a case of transmitting disaster-related information from a positioning satellite, it is difficult to perform such limited information distribution. Therefore, there has been a problem that disaster-related information that is not useful to a user may be presented to the user. Thus, a third embodiment makes it possible to present disaster-related information useful to the user.

The third embodiment will be described mainly with regard to differences from the first embodiment and the second embodiment. A configuration of the electronic equipment 100 according to the third embodiment will be described below.

In the electronic equipment 100 according to the third embodiment, the controller 130 causes the storage 141 to store positional information acquired by the GNSS receiver (receiving unit) 120 in association with time information (time stamp) indicating its acquisition time. The controller 130 may also cause the storage 141 to store the acquired positional information in association with a time stamp when the positional information is acquired in a manner different from satellite positioning.

Methods different from satellite positioning include, for example, a method of acquiring the positional information based on a cellular radio signal received by the cellular communicator 111 from the base station 200, and a method of acquiring the positional information based on a short-range radio signal received by the short-range radio communicator 112 from the access point 300. Methods of acquiring the positional information based on the cellular radio signal include a method based on the reference signal received power (RF fingerprint) from a plurality of base stations 200, a method based on a cell identifier included in the cellular radio signal, and the like. Methods of acquiring the positional information based on the short-range radio signal include a method based on the identifier (SSID) of the access point 300, a method based on positional information included in a beacon signal, and the like.

In the electronic equipment 100 configured in this manner, the GNSS receiver 120 receives a satellite signal (i.e., L1S signal) including disaster-related information related to disaster, and acquires the positional information by satellite positioning.

Based on whether the position corresponding to the positional information acquired by the GNSS receiver 120 (the current position of the electronic equipment 100) is included in a region (hereinafter referred to as "region X") corresponding to the disaster-related information (information related to disaster) acquired by the GNSS receiver 120, the controller 130 performs determination on whether to present the disaster-related information to the user.

Here, longitude and latitude information indicating the geographical range of the region X may also be included in the disaster-related information. For example, if the region X is defined as a polygonal region, the latitude and longitude of each vertex of the polygon may be included in the disaster-related information.

Text information indicating the region X may also be included in the disaster-related information. For example, a text "an earthquake occurred in the region X" may be included in the disaster-related information. The controller 130 extracts a phrase "region X" by analyzing the text and identifies the geographical range of the "region X" by referencing the storage 141. The text (phrase) and the geographical range of each region are registered in advance in the storage 141.

When the position corresponding to the positional information acquired by the GNSS receiver 120 (the current position of the electronic equipment 100) is included in the region X, the controller 130 determines to present the disaster-related information to the user. In this case, the controller 130 controls the display 142 and/or the audio output unit 144 to present (display and/or audibly output) the disaster-related information to the user.

On the other hand, when the position corresponding to the positional information acquired by the GNSS receiver 120 (the current position of the electronic equipment 100) is not included in the region X, the controller 130 determines not to present the disaster-related information to the user.

Thus, since the controller 130 determines not to present the disaster-related information acquired by the GNSS receiver 120 to the user when the position corresponding to the positional information acquired by the GNSS receiver 120 (i.e., the current position) is not included in the region X, the presentation of disaster-related information that is not useful to the user can be suppressed.

However, when the GNSS receiver 120 cannot supplement a sufficient number of positioning satellites, the GNSS receiver 120 may fail to acquire the positional information. In this case, the controller 130 cannot identify the current position corresponding to the positional information.

Thus, when the GNSS receiver 120 acquires the disaster-related information and the GNSS receiver 120 fails to acquire the positional information, the controller 130 determines whether to present the disaster-related information acquired by the GNSS receiver 120 to the user by referencing the storage 141 and using past positional information acquired in a certain past period of time instead of the positional information (current position).

Here, the certain past period of time refers to a period of time in which past positional information is regarded to be valid with reference to the current point of time, and may be a fixed time length set in advance or may be a variable time length. In the case of setting the certain past period of time to be variable, the time length of the certain past period of time may be set according to the movement speed of the electronic equipment 100. For example, the controller 130 sets the time length of the certain past period of time to be shorter than a reference value when the movement speed of the electronic equipment 100 is higher than a predetermined speed. Note that the movement speed of the electronic equipment 100 can be calculated by using a plurality of sets of positional information and time stamps accumulated in the storage 141.

In this manner, even when the GNSS receiver 120 fails to acquire the positional information, the controller 130 can appropriately perform the determination on whether to present the disaster-related information to the user as long as positional information is acquired in the certain past period of time.

When positional information is acquired a plurality of times in the certain past period of time, the controller 130 may perform the determination on whether to present the disaster-related information to the user by using positional information acquired most recently out of the positional information acquired in the certain past period of time (i.e., positional information having a time stamp closest to the current time) as the past positional information. In this manner, it is possible to appropriately perform the determination on whether to present the disaster-related information to the user by referencing a position closest to the current position.

Alternatively, the controller 130 may regard positional information acquired by satellite positioning to have high accuracy and use the positional information acquired by satellite positioning (the GNSS receiver 120) with higher priority than positional information acquired in a manner different from satellite positioning. Specifically, when second positional information is acquired in a manner different from satellite positioning after first positional information is acquired by satellite positioning in the certain past period of time, the controller 130 performs the determination on whether to present the disaster-related information to the user by using the first positional information as the past positional information.

Desired-region information indicating a region for which the user desires presentation may be registered in advance in the storage 141. The controller 130 may perform the determination on whether to present the disaster-related information to the user based on whether the position corresponding to the acquired positional information is included in the region corresponding to the desired-region information registered in advance. In this manner, the user can arbitrarily set a region for which the disaster-related information is to be presented.

The controller 130 performs the processing of the L1S signal only when the electronic equipment 100 is out of the area of cellular communication (that is, when the electronic equipment 100 is incapable of cellular communication). The processing of the L1S signal includes searching (supplementation) of the L1S signal. The processing of the L1S signal may also include demodulation and decoding of the L1S signal.

Note that the electronic equipment 100 according to the third embodiment may not include the acceleration sensor 150.

(Operation Example of Electronic Equipment)

FIG. 7 is a diagram illustrating an operation example of the electronic equipment 100 according to a third embodiment.

As illustrated in FIG. 7, in step S3101, the controller 130 checks whether the electronic equipment 100 is out of the area of cellular communication. That is, the controller 130 checks whether the electronic equipment 100 is capable of cellular communication.

When the electronic equipment 100 is out of the area of cellular communication, that is, when the electronic equipment 100 is incapable of cellular communication (step S3101: YES), in step S3102, the controller 130 performs the processing of the L1S signal.

In step S3103, the controller 130 checks whether the disaster-related information is acquired in step S3102. Here, that the disaster-related information is acquired means that disaster-related information that is not null data, that is, disaster-related information indicating the occurrence of a disaster is acquired from the L1S signal. When the disaster-related information is not acquired (step S3103: NO), the process returns to step S3101.

On the other hand, when the disaster-related information is acquired (step S3103: YES), in step S3104, the controller 130 identifies the region X corresponding to the disaster-related information.

In step S3105, the controller 130 controls the GNSS receiver 120 to perform satellite positioning. However, if the satellite positioning is performed in step S3102, the step S3105 may be omitted.

In step S3106, the controller 130 checks whether the satellite positioning has succeeded, that is, whether the positional information (the current position of the electronic equipment 100) is successfully acquired. When the acquisition of the positional information fails (step S3106: NO), in step S3107, the controller 130 acquires the past positional information (for example, positional information acquired most recently) by reading it from the storage 141.

In step S3108, the controller 130 checks whether the position corresponding to the acquired positional information is included in the region X. When the position corresponding to the acquired positional information is included in the region X (step S3108: YES), the controller 130 determines to present the acquired disaster-related information to the user. Then, in step S3109, the controller 130 controls the display 142 and/or the audio output unit 144 to present (display and/or audibly output) the acquired disaster-related information to the user.

On the other hand, when the position corresponding to the acquired positional information is not included in the region X (step S3108: NO), in step S3110, the controller 130 checks whether desired-region information indicating a region for which the user desires presentation (hereinafter referred to as "desired region") is registered.

When the desired-region information is registered (step S3110: YES), in step S3111, the controller 130 checks whether the desired region and the region X match. That the desired region and the region X match is not limited to a case where the desired region and the region X coincide, and may include a case where the desired region is included in the region X. For example, when the desired region is "A prefecture", the region X is "B region", and "A prefecture" is included in "B region", the controller 130 may determine that the desired region and the region X match.

When the desired region and the region X match (step S3111: YES), in step S3109, the controller 130 controls the display 142 and/or the audio output unit 144 to present (display and/or audibly output) the acquired disaster-related information to the user.

OTHER EMBODIMENTS

Although an example in which satellite signals for disaster-related information reporting services are L1S signals has been described in the above-described embodiments, satellite signals for disaster-related information reporting services may be S-band signals.

A program that causes a computer to execute each process executed by the electronic equipment 100 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example. Also, a functional unit (circuit) for executing each process performed by the electronic device 100 may be integrated, and the electronic device 100 may be configured as a semiconductor integrated circuit (chipset, SoC).

Although one embodiment has been described in detail with reference to the drawings, the specific configuration is not limited to the above, and various design changes and the like can be made without departing from the gist.

The invention claimed is:

1. An electronic equipment comprising: a cellular communicator configured to perform cellular communication with a base station; a receiver configured to receive, from a satellite, a signal of information related to disaster; an acceleration sensor; and a controller configured to perform processing of the signal when the electronic equipment is incapable of the cellular communication, wherein the controller is configured to: in response to the processing of the signal failing in a state where the processing of the signal has started, determine whether the electronic equipment has moved based on an output of the acceleration sensor; stop the processing of the signal when determining that the electronic equipment has not moved; and
    after stopping the processing, start the processing of the signal when determining that the electronic equipment has moved.

2. The electronic equipment according to claim 1, wherein the controller is configured to start the processing of the signal when the electronic equipment changes from a state of being capable of the cellular communication to a state of being incapable of the cellular communication in a state where the processing of the signal is stopped.

3. The electronic equipment according to claim 1, wherein the controller is configured to stop the processing of the signal when the electronic equipment changes from a state of being incapable of the cellular communication to a state of being capable of the cellular communication in a state where the processing of the signal is started.

4. The electronic equipment according to claim 1, wherein the controller is configured to:
    perform processing of a cellular signal of information related to disaster received by the cellular communicator in a state where the electronic equipment is capable of the cellular communication; and
    perform the processing of the signal received by the receiver in a state where the electronic equipment is incapable of the cellular communication.

\* \* \* \* \*